(12) United States Patent
Vera (10) Patent No.: US 7,289,493 B1
(45) Date of Patent: Oct. 30, 2007

(54) SYSTEM AND METHOD FOR PROVIDING LOCATION INDEPENDENT VOICE COMMUNICATIONS CONTINUITY THROUGH DISASTERS

(75) Inventor: Raul Vera, Darnestown, MD (US)

(73) Assignee: Telecontinuity, Inc., Silver Spring, MD (US)

( * ) Notice: Subject to any disclaimer, the term of this patent is extended or adjusted under 35 U.S.C. 154(b) by 991 days.

(21) Appl. No.: 10/370,059

(22) Filed: Feb. 21, 2003

Related U.S. Application Data (60) Provisional application No. 60/359,281, filed on Feb. 21, 2002.

(51) Int. Cl.
*H04L 12/66* (2006.01)
(52) U.S. Cl. .................. 370/356; 370/352; 370/353
(58) Field of Classification Search ............... 370/356, 370/352, 353, 270
See application file for complete search history.

(56) References Cited

U.S. PATENT DOCUMENTS

| | | | |
|---|---|---|---|
| 4,853,949 A | 8/1989 | Schorr et al. ................... 379/2 |
| 5,216,704 A | 6/1993 | Williams et al. ......... 379/93.08 |
| 5,249,223 A | 9/1993 | Vanacore ............... 379/266.06 |
| 5,596,625 A | 1/1997 | LeBlanc .................... 455/404 |
| 5,627,827 A | 5/1997 | Dale et al. .................. 370/359 |
| 5,692,033 A | 11/1997 | Farris ......................... 379/67.1 |
| 5,844,974 A | 12/1998 | Ichikawa .................... 379/138 |
| 5,943,404 A | 8/1999 | Sansom et al. .......... 379/93.06 |
| 5,982,870 A | 11/1999 | Pershan et al. ........ 379/221.08 |
| 6,449,260 B1 * | 9/2002 | Sassin et al. ............... 370/270 |

OTHER PUBLICATIONS

Bill Douskalis, "IP Telephony: The Integration of Robust VoIP Services", Prentice Hall PTR, 2000.
IETF RFC 2543 SIP: Session Initiation Protocol.
W. Jiang, J. Lennox, H. Schulzrine, and K. Singh. "Towards Junking the PBX: Deploying IP Telephony", NOSSDAV'01 Jun. 25-27, 2001, Port jefferson, New York, USA.
W. Marshall et al, "Architectural Considerations for Providing Carrier Class Telephony Services Utilizing SIP-based Distributed Call Control Mechanisms", Internet Draft, IETF, SIP Working Group, Aug. 2001.

(Continued)

*Primary Examiner*—Ahmad F. Matar
*Assistant Examiner*—Karen Le
(74) *Attorney, Agent, or Firm*—Irah H. Donner; Wilmer Cutler Pickering Hale and Dorr LLP (57) ABSTRACT

A method and system, employing IP telephony, for providing continuous, uninterrupted voice communications during disaster conditions wherein the disaster site telephone infrastructure has been rendered inoperable or inaccessible. The system uses Voice over IP (VoIP) and emerging IP telephony standards to enable users to receive telephone calls, normally destined for their work phone, at a personal computer terminal connected to the Internet. Users can also place calls from their terminal to the PSTN or to other users on the system. Combining telephone line redirection with IP telephony capabilities enables the construction of a system that provides users with unlimited flexibility in responding to a severe business interruption with full voice communications. The system can be customized so calling parties will be presented with precisely the same greetings and messages, for each user telephone extension, that were present in the disaster site's telephone system. Switching from the disaster site's telephone infrastructure to the system can be accomplished in minutes.

4 Claims, 10 Drawing Sheets

OTHER PUBLICATIONS

Steve Donovan and Matthew Cannon, "A Functional Description of a SIP-PSTN Gateway". Internet Draft, MCI WorldCom, Nov. 15, 1998.

Alan Johnston et al, "SIP Call Flow Examples". Internet Draft, IETF, Jun. 2001.

Lennox and Schulzrinne, "CPL: A Language for User Control of Internet Telephony Services", Internet Draft, IETF, IP Telephony Working Group, Jan. 2002.

Cisco IP Telephony Network Design Guide Cisco Technical Solution Series: IP Telephony Solution Guide, Version 2.0, Jun. 2001.

Cisco White Paper: Choosing a Voice-over-IP Gateway-A 3.0 Gateway Solution Guide.

Cisco White Paper: Deploying H.323 Applications in Cisco Networks.

* cited by examiner

|   | A | B | C | D | E | F | G | H |
|---|---|---|---|---|---|---|---|---|
| 1 | fname | lname | acct_num | tel_num | tel_ex | red_num | ip_address | session_id |
| 2 | Ann | Iam | 678-87-9999 | 301-555-4424 | 8100 | 888-555-1000 | 148.25.69.83 | 6758493 |
| 3 | Juan | Lopez | 564-65-8790 | 301-555-4424 | 8101 | 888-555-1000 | NULL | NULL |
| 4 | Juliet | Prouse | 456-76-9376 | 301-555-5000 | NULL | 888-555-5000 | 172.48.96.20 | 9876995 |
| 5 | Luis | Salvado | 325-75-8769 | 301-555-3000 | NULL | 888-555-5600 | 138.90.7.45 | 8798554 |
| 6 | Maynard | Steeples | 546-45-2356 | 301-555-4424 | 7892 | 888-555-1000 | 226.25.63.90 | 5463387 |

FIG. 14

SYSTEM AND METHOD FOR PROVIDING LOCATION INDEPENDENT VOICE COMMUNICATIONS CONTINUITY THROUGH DISASTERS

RELATED APPLICATIONS

This application claims priority to, and incorporates by reference, U.S. Provisional Application No. 60/359,281 filed on Feb. 21, 2002, and incorporated herein by reference.

BACKGROUND

This invention relates to communications capabilities available to businesses, specifically communications capabilities available to businesses during and immediately following disaster events. In the present context, a disaster is characterized by any event that renders one or more sites of a business incapable of receiving and responding to telephone calls from the external world. Disasters are also characterized by a business site's inability to place telephone calls to the outside world. During some disasters, it is possible that the site's communication infrastructure will be rendered inoperable viz. the Private Branch Exchange (PBX) suffers damage.

In other situations, the communications infrastructure may be inaccessible by business users (users) but left intact. In either case normal methods of communication by telephone are no longer available to the business.

By way of example during the Sep. 11, 2001 terrorist tragedy, where the World Trade Center in New York City was destroyed, corporate users, henceforth referred to as users, were dispersed throughout the City and its Boroughs. Some started to work out of their homes. Others set up operations in hotels or were transported to the appropriate hot site. Hot sites are locations where the business had contracted with a third party to provide disaster recovery services and systems access to data for users. It is likely that telephone service was provided at these hot sites.

However, the fabric that is known as the telephone directory for the businesses undergoing the disaster was destroyed. Thus, customers were not able to speak to points of contact (users) within the business by dialing their phone number on a business card as they usually did. Normal channels of voice communications such as cellular phones were also disrupted on a wide scale due to overloading of the cell grids. Hotel private branch exchanges (PBX) were likely overloaded by the sheer traffic being experienced far in excess of conditions that these systems were designed to handle. All of this adds up to a severe business interruption even though corporate data was well safeguarded and available in the vast majority of cases. Businesses subjected to such disasters have no effective way of dealing with day-to-day, routine voice communications. This capability is crucial to businesses where voice communications with customers is the primary method of conducting business (insurance companies, brokerage houses, etc) and making sales.

Hot sites can be equipped to handle telephone communications in addition to providing on-line access to customer data. To take advantage of this capability customers must provide their telephone company a switchover plan to be executed in the event of a disaster. The plan must be coordinated with the hot site vendor. The switchover can take from twenty-four to forty eight hours. Thus the customer is left with no telephone communications during and immediately after the disaster event. What's more, it is likely that the customers'PBX was loaded with numerous announcements and features, each employee having customized their extension. All of these will be lost during the disaster. Finally, since most medium to large customers have PBXs connected to the telephone company via T-1 with DIDs they rely on the PBX to provide the intelligence required to direct individual calls to particular extensions. It is likely that this capability will also be lost as a result of the disaster.

PRIOR ART

Prior art contains numerous examples of methods and systems designed to address the problem of reliable telephone communications. In particular, U.S. Pat. No. 4,853,949 to Schorr et al and U.S. Pat. No. 5,943,404 to Sansom et al show methods and systems for ensuring that Integrated Services Digital Network (ISDN) lines to a customers premise remain active and powered during a power outage at said customer's premises. Similarly, U.S. Pat. No. 5,627,827 to Dale et al shows a local exchange system for integrating analog plain old telephone service (POTS) lines with ISDN lines and controlling the switchover of telephone service. This also provides the capability to maintain telephone service through a power outage at the customer's premises. The foregoing prior art do not address the issue of a disaster occurring at the customer's premises wherein said customer no longer has use of the PBX.

In another area of prior art emergency telephone communications are addressed with respect to traffic congestion. For example, U.S. Pat. No. 5,844,974 to Ichikawa et al shows a method and system of ensuring that customers can place calls during emergency situations regardless of the number of regular outbound trunks in service. The prior art addresses telephone communications through and immediately after disaster events in U.S. Pat. No. 5,982,870 to Pershan et al. Pershan et al present a method for concurrently redirecting, or call forwarding, a multitude of phone numbers to alternative phone numbers and therefore locations. The method disclosed by Pershan et al does not allow for individual freedom of movement and does not provide an inherent capability to anticipate problems that may be a direct result of the disaster or for other reasons. For example, I have determined that it may be the case that the alternate locations where lines are redirected are inaccessible due to traffic problems caused by the disaster. These locations may also have become inaccessible as a result of the disaster. In any case, it may be several hours or days before individuals can reach the intended redirection location(s). In the case of biological disasters, such as terrorist use of a biological weapon, employees may be sequestered or quarantined in their homes or their current location. As stated previously, in the event individuals have access only to a hotel it may prove impractical to redirect their phones to that hotel for a number of reasons. Still, if it were practical, arrangements would have to be made ahead of time with the hotel which, in and of itself, restricts users to specific locations during the disaster. Further, unless well thought out in advance with appropriate agreements in place, I have determined that lines may have to be redirected to phones that are currently in use for another purpose. Thus callers to the business may be presented with an unfamiliar greeting or worse a complete rejection of the call. In general, Pershan et al do not address other critical issues such as diversity in redirection location in real-time and end-user flexibility.

Other practical limits exist on the disclosure of Pershan et al. For example, treatments applied to extensions that normally originate in a PBX, and are now redirected to another number and location, will most likely not be available. Extensions applied by the PBX to direct inward dial (DID) lines will also not be available. Users with a DID line assigned to them may have to share the redirected DID line at the same physical location. This becomes impractical and also removes the ability for callers to get to a specific individual by dialing their number then their extension (originally assigned by the PBX). Even leaving voicemail may not be practical depending on the equipment available at the various preset disaster sites, and in any case will require additional and expensive infrastructure to be available (perhaps a full featured PBX).

There is yet another subtle but significant limitation on the Pershan et al patent for the communications continuity application. Pershan et al rely exclusively on the existing PSTN infrastructure. Indeed, this is one of the more elegant aspects of the present invention. At the same time, widespread availability of the service afforded by the Pershan et al patent has not materialized. and is geographically limited.

SUMMARY

The invention comprises a system and method for enabling users to receive telephone calls, placed to telephone extensions at their job site, at any location they see fit so long as an Internet connection and a personal computer terminal are available. In accordance with the present invention a system comprises a gateway device connected to the public switched telephone network (PSTN) and a geographically dispersed data network such as the Internet or a Virtual Private Network (VPN). Said gateway is connected to a control segment comprised of a sufficient number of computers to permit controlling said gateway, storing user profiles, extensions, telephone numbers, voicemail messages, text messages, control algorithms, and other data, databases, and running the system software. Said users establish a connection with the control segment over said data network by using application software such as an Internet browser. Said control segment directs said gateway to establish a connection with said personal computer for the purpose of receiving phone calls normally destined for said users work extension or work phone number. Thus said users will be able to receive and place phone calls through their work phone number or extension, as if they were at their normal job site, from any location where there is an Internet connection or access to a pre-established VPN.

Accordingly, several independent and optional objects and advantages of the invention are:

To provide a system to enable users to conduct telephone communications during a disaster condition where the normal communications infrastructure is not available, has been destroyed or rendered inoperable, or simply cannot be accessed physically.

To provide a mechanism for re-routing existing telephone numbers to ring where required, in real time, independent of location or the existence of a ready telephone number at the new location.

To provide for additional line capacity precisely for disaster conditions when telephone traffic is higher than normal.

To present calling parties with the numbers and options to reach users in a manner that replicates normal calling conditions (i.e. non-disaster conditions) if so desired by said users.

To provide users with a means of creating and maintaining profiles within the system to enable rapid login and redirection of their phone number or extension to the personal computer at their current location.

To enable users to add features and other enhancements, such as scheduled messages, calling options, etc, to their profile so as to present calling parties with appropriate information during and subsequent to the disaster condition.

To enable creation of telecommuting services and options for users during disaster recovery phases by enabling said users to redirect their phones and extensions to the location of their choice on demand and in real-time as many times as necessary to compensate for the unplanned nature of the disaster.

To provide a voice conference capability during and subsequent to a disaster condition thereby permitting users to form, direct, and consult in teams and groups which better able to deal with the catastrophe and attendant recovery actions.

To provide businesses with a simple and effective method of accounting for users during and after a disaster event by providing a tally of those employees that have logged into the system and their present location (which is manually entered by the employee).

To enable businesses to rapidly deploy a simplified disaster recovery infrastructure so that a single cable plant is required to deliver phone and data services at a location (disaster recovery site).

To further enable businesses to rapidly deploy a simplified and low cost disaster recovery infrastructure by removing the need for a PBX at the disaster recovery site or enhanced services from the telephone company (such as Centrex services).

To provide businesses with a method of integrating the existing enterprise messaging infrastructure including email, faxing, etc. with disaster recovery voice communications.

Still further objects and advantages will become apparent from a study of the following description and accompanying drawings.

DESCRIPTION

Figure 1:
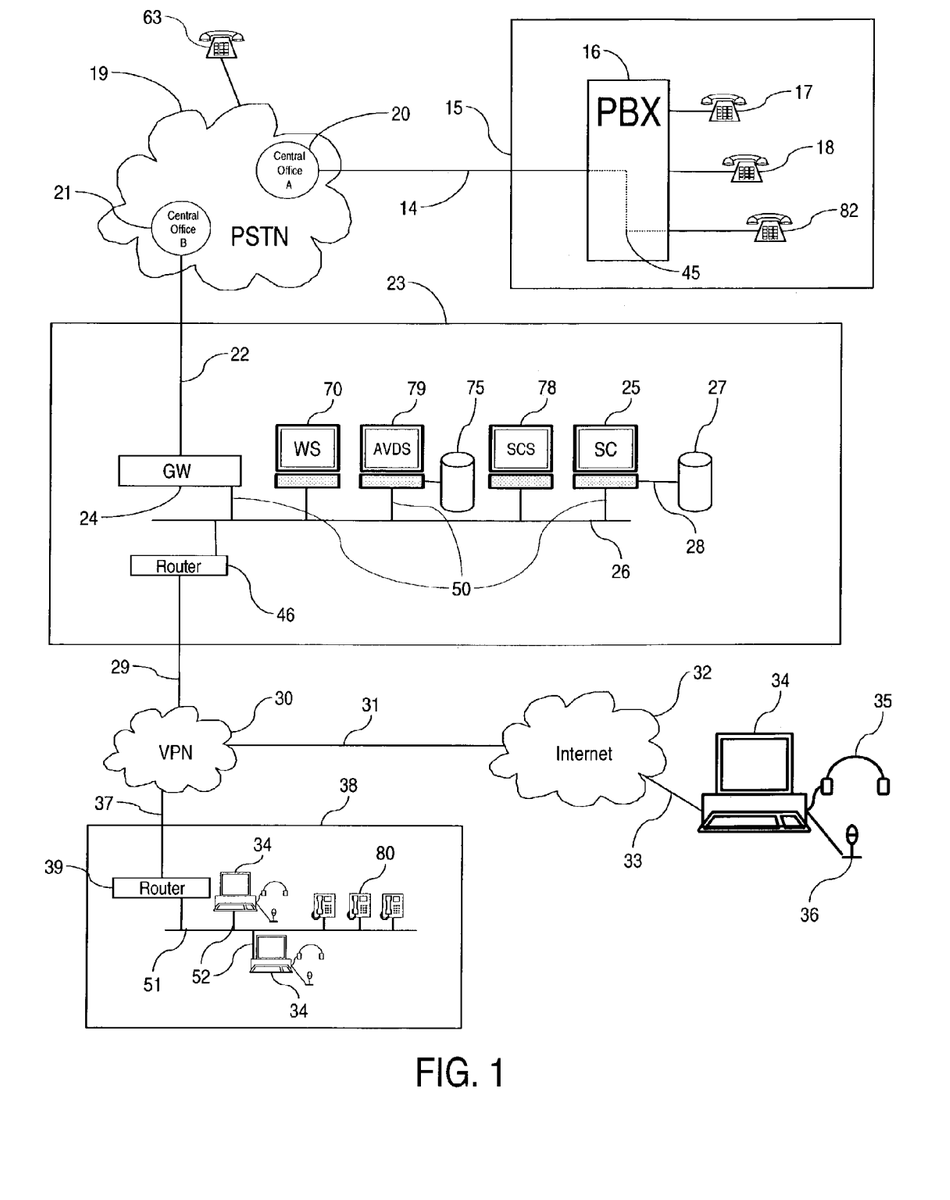
FIG. 1 is a schematic block diagram, according to the invention, depicting the network interconnections and associated devices to redirect telephone calls from a business's location to data terminals connected to a VPN or the Internet.

In FIG. 1 a business site 15 houses a PBX 16 with telephone sets 17, 18, and 82 attached. The three telephone sets are representative of telephones for users at the business site (maybe up to several hundred or more). Telephone set 82 is connected 45 to a DID line. Telephone sets 17 and 18 are connected to extension lines. The PBX 16 is connected 14, e.g. by voice T-1 lines, to the Telephone Company's Central Office A (COA) 20 within the PSTN 19. Central Office B (COB) 21, also within the PSTN 19, is connected 22 to a Voice over IP (VoIP) gateway (GW) 24 device housed within a Control Segment (CS) site 23 which is removed from the business site 15. GW 24 is further connected 50 to a local area network (LAN) 26 to which are also connected a plurality of computers of the system. Said computers include a WEB Server (WS) 70, the Auto Attendant Voice Mail Dialer Server (AVDS) 79, a Conference Server (SCS) 78, and the System Controller (SC) 25. SC 25 has access 28 to the User Profile database (UPD) and the System Statistics database collectively referred to as 27. The UPD contains all information necessary to administer and control the system of the invention. For example, the UPD houses all of the user profiles including first name, last name, password, announcements, telephone numbers, IP addresses, etc. The SSD houses all transaction and performance related information viz. call start times, number of SIP registrations, failed connection attempts, connect times, online times, etc.

The LAN 26 of FIG. 1 is connected 50 to a Router 46 which is further connected through a high speed data line 29 to a virtual private data network (VPN) 30. The VPN 30 is connected through a high-speed data line 31 to the Internet 32. Users access the system by making a connection 33 from a personal computer 34 to the Internet 32. Each personal computer 34 is equipped with a sound card, headphones 35, and a microphone 36. The connection 33 can be made through any Internet Service Provider (ISP) by dial-up, high-speed cable service, Digital Subscriber Line (DSL), or through any other method available.

The VPN 30 is also connected through a high-speed data line 37 to one of a possible plurality of hot sites or disaster recovery sites 38. Connection to the disaster recovery site 38 is accomplished through a router 39 that is connected to a local area network (LAN) 42 within the site 38. Personal computer terminals 34 are connected to the LAN 42 in the disaster recovery site 38.

Figure 2:
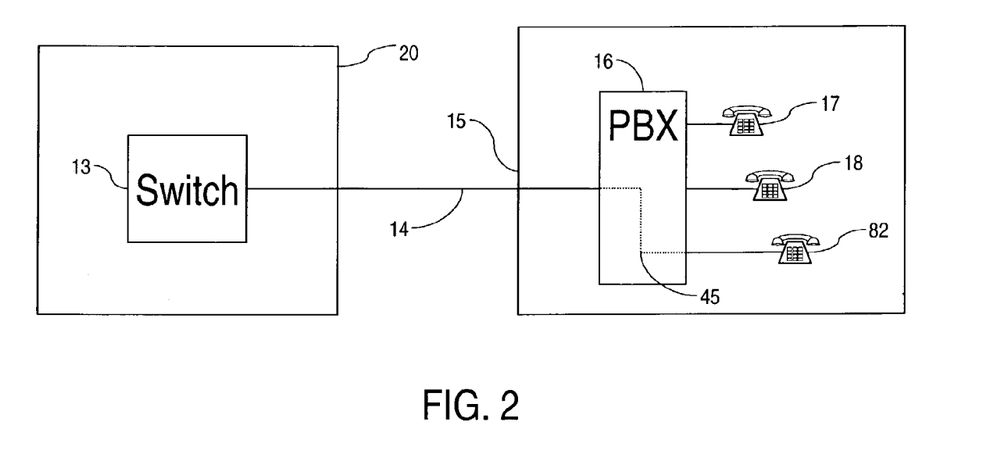
FIG. 2 is a prior art block diagram depicting a generalized PBX connected to a central office switch.

FIG. 2 is introduced to aid illustration of other methods of connecting the system of the invention to the PSTN. Connection 14 comprises direct inward dial (DID) lines implemented over digital T-1 lines or analog lines. This is usually the case for medium to large businesses with many users (on the order of hundreds). Connection 14 may also comprise plain old telephone service (POTS) lines over T-1s or analog lines.

Figure 3:
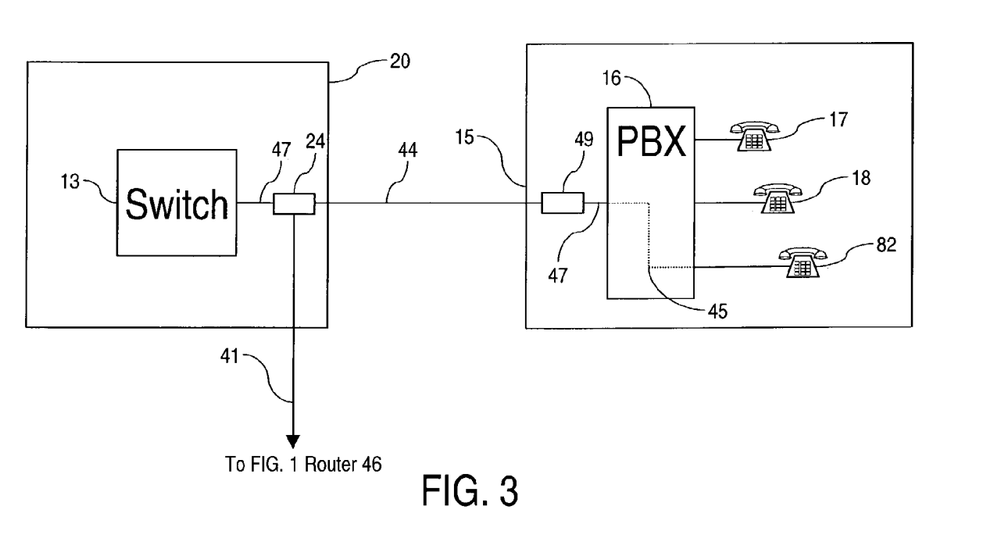
FIG. 3 is a schematic block diagram depicting a second method of connecting the system to the PSTN.

FIG. 3 shows another method for the invention of connecting the CS 23 to the PSTN. Connection 14 of FIG. 2 is replaced by a connection 47 from the switch 13 at the COA 20 to a GW 24. An Internet protocol (IP) connection 44 is made between the GW 24 and another VoIP gateway (GW) 49 at the business site 15. GW 49 is connected to the PBX 16 through analog or digital phone lines 47. An IP line 41 connects GW 24 to the router 46 of FIG. 1.

Figure 4:
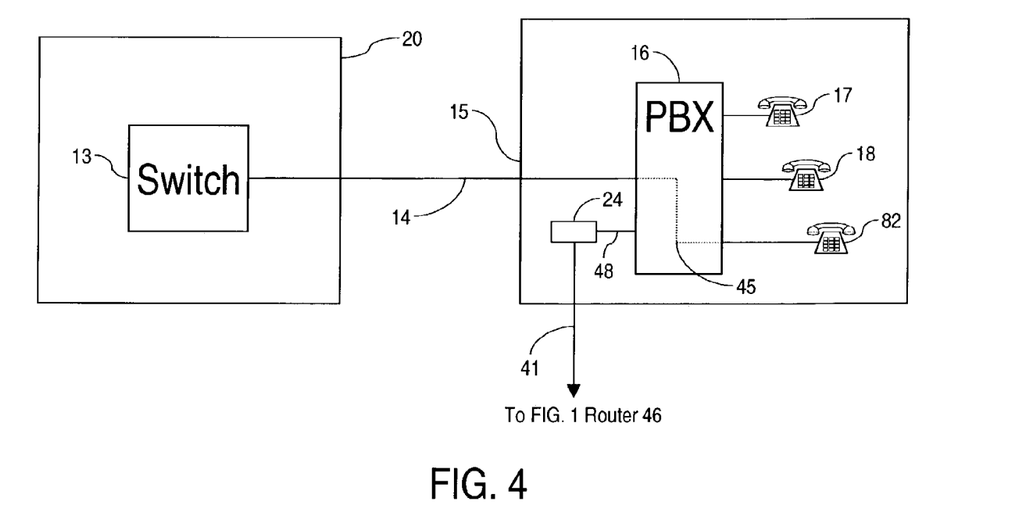
FIG. 4 is a schematic block diagram depicting a third method of connecting the system to the PSTN through the PBX.

FIG. 4 shows another method of connecting the system of the invention to the PBX 16 and the COA 20 switch 13. Connection 14 of FIG. 1 between the central office and PBX 16 is left intact. In FIG. 4 a connection 48 is made between the PBX 16 and a GW 24. The GW 24 is connected 41 to the router 46 of FIG. 1 through a data line 41.

Figure 5:
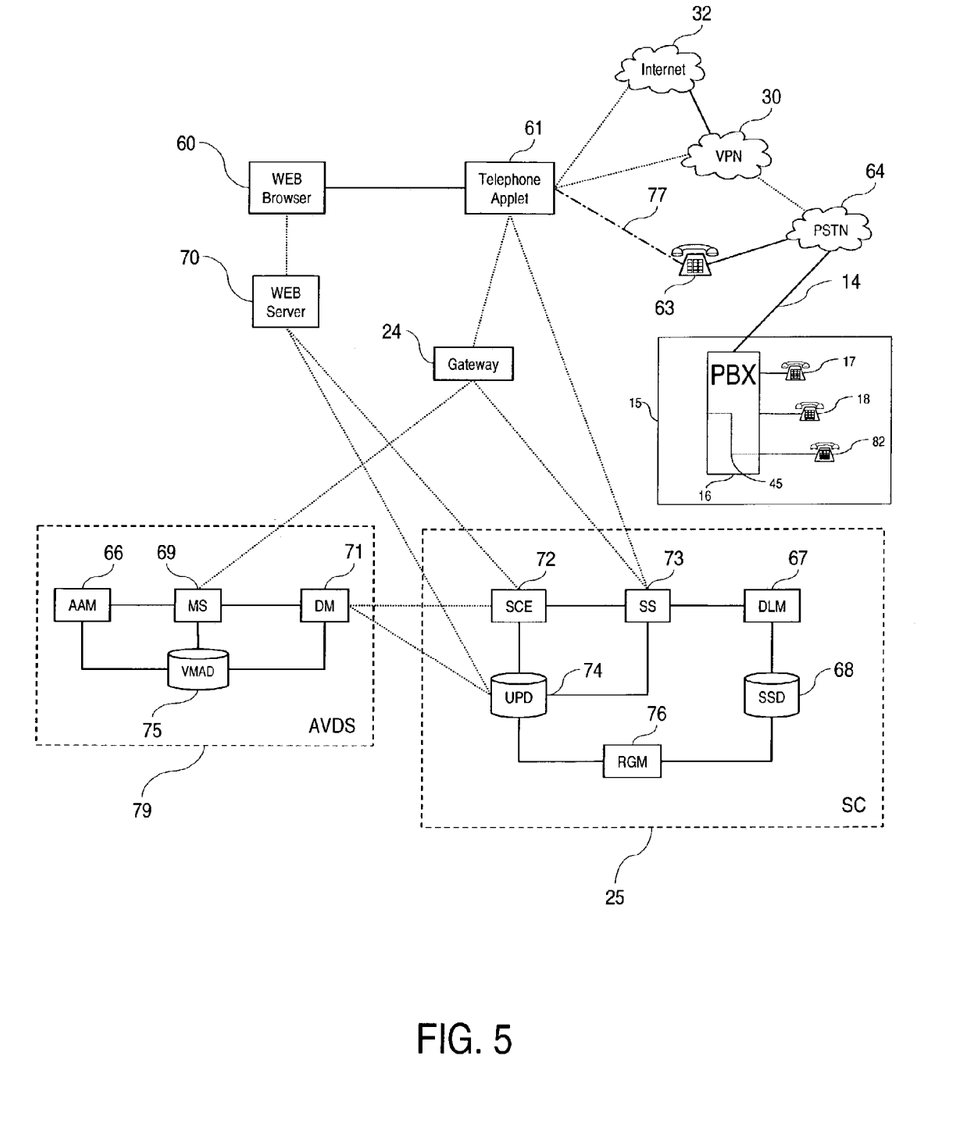
FIG. 5 is a block diagram of a possible software architecture for the system depicting one embodiment of the invention.

FIG. 5 depicts a possible software architecture of the system of the invention for the current embodiment. The system controller (SC) 25 software hosts 4 software processes as follows:

1. System Control Executive (SCE) 72
2. Session Initiation Protocol (SIP) Server (SS) 73
3. Data Logger Module (DLM) 67
4. Report Generator Module (RGM) 76 (connected to the three system databases 74, 75, and 68)

Additionally, the SC 25 comprises two databases in this architecture:

1. User Profiles Database (UPD) 74
2. System Statistics Database (SSD) 68

The system controller is logically connected to WEB server (WS) 70 through which users log into the system from their WEB browser (WB) 60 running on their personal computer terminal 34. WS 70 hosts WEB pages and applets (such as the telephone applet (TA) 61) that enable users to navigate and use a plurality of user interface screens comprising administrative and other system functions (such as recording messages, playing back voice mail, entering extension numbers, etc.).

The Auto Attendant-Voice Mail-Dialer Server (AVDS) 79 is hosted on another computer server platform and hosts three software modules and a database as follows:

1. Auto Attendant Module (AAM) 66,
2. Dialer Module (DM) 71,
3. SIP Compliant Media Server (MS) 69, and
4. Voice Mail and Announcements Database (VMAD) 75

The AVDS 79 is logically connected to the SC 25 and can also establish SIP sessions with callers located in the PSTN or connected to the system.

The Telephone Applet 61 executes in a WB 60 on the user's personal computer terminal 34 of FIG. 1. A calling party 63, is connected to the PSTN, and establishes a virtual connection 77 to the Telephone Applet 61 through the Gateway 24 of FIG. 1, the VPN 30 and the Internet 32. The original business site 15 is also shown.

REFERENCE NUMERALS

14 Telephone trunk lines
15 Business Site

16 PBX (private branch exchange)
17 Telephone set assigned extension A (Line A)
18 Telephone set assigned extension B (Line B)
19 Public Switched Telephone Network (PSTN)
20 Central Office A (COA) connected to business PBX (original destination for calls)
21 Central Office B (COB) connected to the Control Segment (alternate destination for calls)
22 Telephone voice trunk lines (TDM) e.g. POTS lines or T-1 PRI spans
23 Control segment (CS)
24 Voice over IP (VoIP) Gateway or Gateway (GW)
25 System Controller (SC)
26 Local Area Network (LAN)
27 System databases: User Profile Database and System Statistics Database
28 Connection between SC 25 and system databases 27
29 Digital data line or lines e.g. T-1 or multiple T-1's
30 Virtual Private Network (VPN) using IP
31 Digital data line or lines e.g. T-1 or multiple T-1's
32 Internet
33 Internet Service Provider connection to the Internet
34 Personal Computer with sound card (Terminal)
35 Audio Headset
36 Microphone
37 Digital data line or lines e.g. T-1 or multiple T-1's
38 Hot site or other disaster recovery location
39 IP Router
41 Digital data line or lines e.g. T-1 or multiple T-1's
44 Digital data line or lines e.g. T-1 or multiple T-1's
45 POTS Line running through PBX to telephone set
46 IP Router
47 Telephone trunk lines
49 VoIP Gateway
50 LAN connection (e.g. twisted pair, thin coaxial cable, etc)
51 IP LAN (e.g. 10BaseT, 100BaseT, Ethernet, etc)
52 LAN connection (e.g. twisted pair, thin coaxial cable, etc)
60 WEB Browser (WB)
61 Telephone applet (software telephone)
63 Calling party telephone set
66 Auto Attendant Module (AAM)
67 Data Logger module (DLM)
68 System Statistics database (SSD)
69 Media Server (MS)
70 WEB Server (WS)
71 Dialer Module (DM)
72 System Control Executive (SCE)
73 SIP Server (SS)
74 User Profile Database (UPD)
75 Voicemail & Announcements Database (VMAD)
76 Report Generator module (RGM)
77 Virtual circuit
78 SIP Conference Server (SCS)
79 Auto Attendant-Voice Mail-Dialer Server (AVDS)
80 IP phone
82 Telephone set with DID number 301-555-9999

OPERATION

In FIG. 1, calls placed over the PSTN 19 to the telephone numbers assigned to telephone sets 17 and 18 reach the PBX 16 causing telephone sets 17 or 18 to ring once the calling party has entered the proper extension numbers when prompted by the PBX auto attendant. A preferred embodiment, shown in FIG. 1, assumes that the Telephone Company serving the business site 15 offers a service for concurrently redirecting multiple lines in the PSTN. In lieu of this, a method of redirecting the telephone lines 14 to the alternate lines 22 should be available. Such a method can be used in combination with the system of the present invention and its operation is described later. In accordance with the present invention, however, the redirection should take place on demand through manual intervention or automatically through other features available in the PSTN 19. For example, depending on the nature of the lines 14 a feature could be invoked at the central office 20 that redirects the lines 14 on failure of the PBX (as in "transfer on no answer"). Using a line forwarding method based within the PSTN obviates the need to introduce equipment at either the COA 20 or the business site 15 as shown in FIGS. 3 and 4 thereby making the system of the invention more robust, less intrusive, easier to implement, more flexible, and easier to manage than the prior art including Pershan, et al.

In FIG. 1, during disaster conditions, telephones lines normally directed to the PBX 16, over connection 14, are redirected to the Gateway 24 within the CS 23 over the trunk lines 22. The call would be presented to the GW 24 and signaling information arriving with the call is translated by the GW 24 and sent to the SS 73 of the SC 25.

User Login Process

The user login process, which is central to the establishment of calls between the user and the PSTN, will be presented prior to examining call processing by the system of the invention. The login process is presented by way of example and, using FIG. 1, assumes that the user has a terminal 34 which is connected 33 to the Internet 32.

Figure 6:
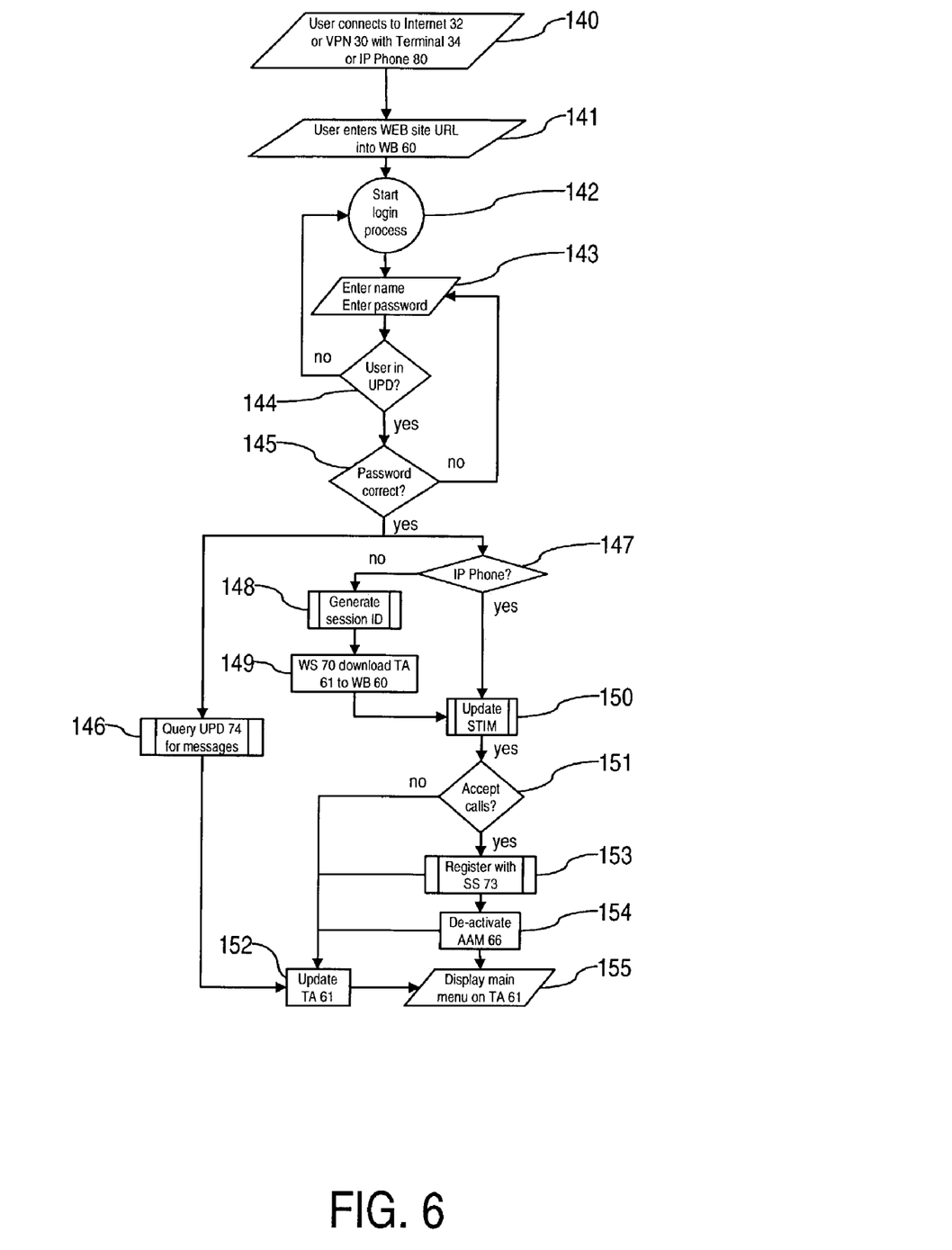
FIG. 6 is a flow chart showing a routine for system login and redirection of lines from central office A to the system and ultimately the user on the Internet.
Figure 7:
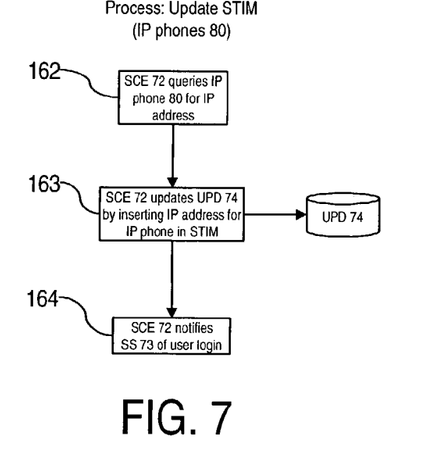
FIG. 7 is a flowchart of a sub-routine of the flowchart of FIG. 6 showing a process for updating the Session-Telephone-IP address-Map (STIM) of the system by users logging in using IP phones.

The login process uniquely identifies a user in order to properly route calls to their terminal. FIG. 6 is a flowchart of the login process. In this embodiment of the invention the login process resides partly in the SCE 72 software module of the SC 25 and partly in the UPD 74 (perhaps through the use of stored procedures) both shown in FIG. 5. In FIG. 6, after completing step 140 by logging into the Internet using an ISP, the user proceeds to execute their WB 60 and enter the System Website URL, step 141. WB 60 brings up the system home page initiating the system user login process, step 142, and the user is prompted for a user name or account number and password, steps 143 and 145. If the account number cannot be found, step 144, in the UPD 74 or the password does not correspond to the account number, step 145, the user is directed to re-enter the information. This is a simple procedure to authenticate the user base and can be enhanced as needed for specific applications requiring varying levels of security. It is also possible to implement X.500 or LDAP directory service authentication or other similar administrative security methodologies.

System Initialization

Figure 10:
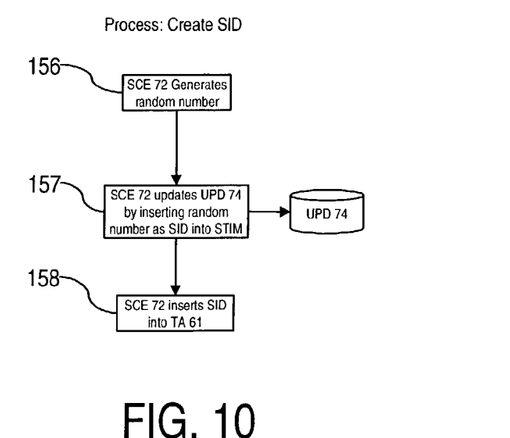
FIG. 10 is a flowchart of a sub-routine of the flowchart of FIG. 6 showing a process for creating a Session Identification number (SID) during login.

Having successfully logged into the system the user is now online with respect to the system. The SCE 72 issues a query to the UPD 74 that returns a list of voice mail messages, step 146, (if any) that the user may have received while offline. Concurrently SCE 72 determines that the user is using a terminal 34 by querying WB 60, step 147, and generates a session ID (SID) (see FIG. 10 for process: create SID), step 148. The session ID is bundled, or packaged, along with TA 61 by the SCE 72 which then directs the WS 70 to download TA 61 to the users WB 60, step 149. Packaging the SID with TA 61 can be a accomplished in a variety of ways including:

(1) Placing the SID in a text file and using Pkzip to archive said text file and TA 61 into a single file for transmission; or (2) Compiling the TA as part of step 148 and embedding the SID within the executable during compilation; or (3) Constructing TA 61 using software technology such as JAVA. In this case the SID can be transferred as part of a CAB file containing the executable code for TA 61; or (4) Combining the SID in a self-extracting file along with the TA as is done with software installation programs Incorporating the SID into the TA ensures that the TA used to connect to the system is the proper TA and enables control of the TA by the system which may be required to ensure proper CODEC selection, for example. Verification of the SID occurs in step 150 where the Session-Telephone-IP address Map (STIM) is updated. It is useful to go into some detail about the purpose and construction of the STIM.

The Session-Telephone-IP Address Map (STIM)

Figure 14:
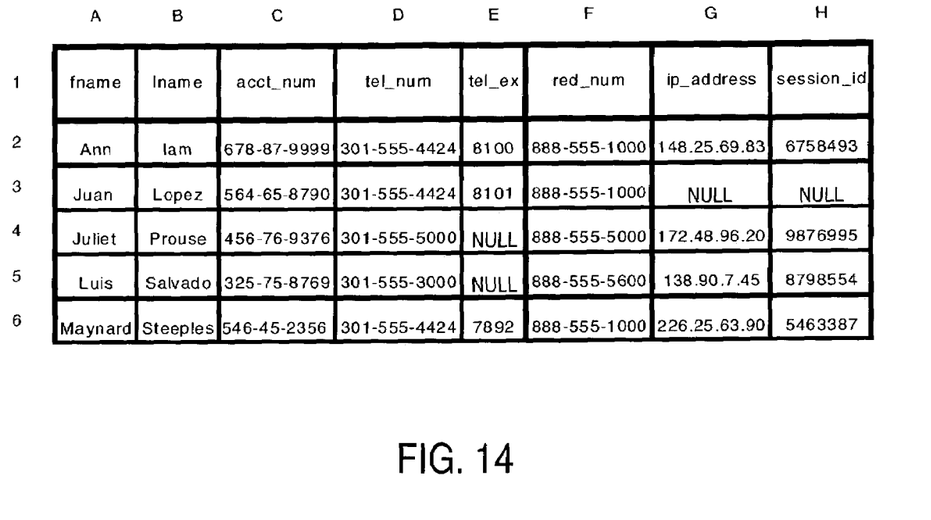
FIG. 14 is a simplified data model of the User Profile Database (UPD 74) of FIG. 5.

FIG. 14 shows an example of what a STIM would look like within the current embodiment. The function of the STIM is to provide a dynamic, session dependent, logical mapping of user telephone numbers and extensions to their IP address. Since the current invention directly addresses communications continuity within a disaster context in accordance with one embodiment, it is expected that IP addresses of users of the system will change from session to session. In this context a session is defined to be the period of time a user is in the online state. Factors I have identified that create this dynamic are:

1. Domain Name Service (DNS) lookups for locating users within an internetwork cannot be relied upon to provide IP address mapping, and
2. ISPs normally implement DHCP or WINS services to enable IP address re-use. Thus each time a user connects to the Internet through their ISP the IP address assigned to their terminal 34 will be different.
3. During and post-disaster users may have to stay home or be forced to log in from a hotel, library, a friend's house, or other location making sessions temporary in most cases. When they log in again, say from another location, their IP address will be completely different all the way to the top-level domain.

Point 1 above bears closer scrutiny as it represents a subtle but significant feature by creation and use of the STIM. IP telephony standards rely on DNS to locate users within and across domains. This approach assumes prior knowledge of the user's whereabouts within the domain structure of the enterprise. Further, it assumes ready access to IP address maps contained in hosts and routers. None of this data exists in the disaster scenario for which the system of the invention has been designed.

These factors make the IP address session dependent and difficult to determine through traditional internetwork resources. Thus, the STIM, in accordance with one embodiment of the invention advantageously comprises a self-contained, dynamically adaptive, logical entity, driven by user interaction with the system, that maps each new IP address to the corresponding user's telephone number on a session by session basis.

Figure 13:
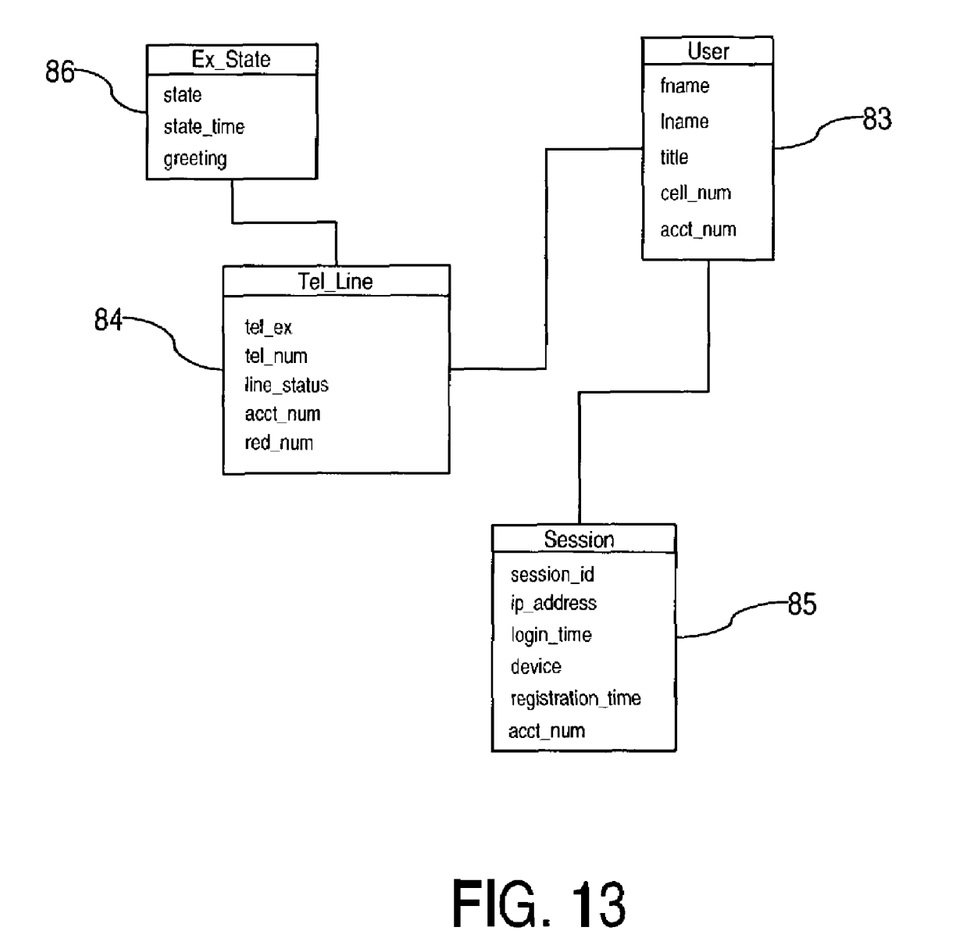
FIG. 13 is a flowchart showing a sequence of steps and processes for forwarding (redirecting) telephone numbers to new numbers and locations by the system of FIG. 5.

FIG. 14 shows an example of a STIM in table format, for the current invention, that is a logical entity formed as a result of a query issued by the SCE 72 to the UPD 74. For reference, letters across the top of the table correspond to columns and numbers down the left side of the table correspond to rows. Row 1 contains column labels that are actually field names (or columns) from various tables in the sample data model for the UPD 74 shown in FIG. 13. Columns A, B, and C are formed from table User, columns D, E, and F are formed from table Tel_Line and columns G and H are formed from table Session in FIG. 14.

Referring to FIG. 10 it is seen that a session ID (SID) is generated using a random number generator (or a unique sequence number generator present in most RDBMS engines), step 156. UPD 74 is updated by inserting the newly created SID in table Session (in the session_id field), step 157. Alternative generation methods may optionally be used. This step forms a new row in the STIM since row creation is driven by session creation or user logins. That is, in one embodiment, there will be a new row created for each session for each user. Finally, the SID is inserted into or packaged with TA 61 in preparation for downloading, step 158.

Figure 8:
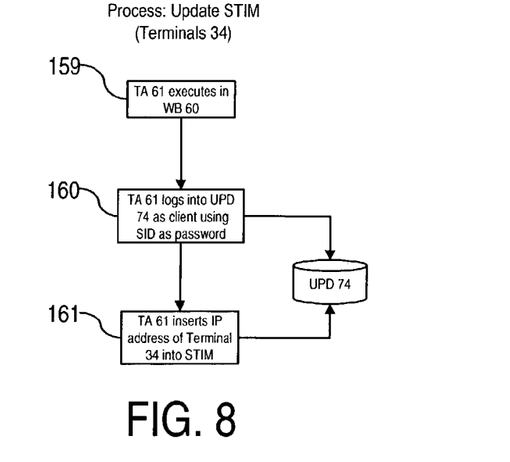
FIG. 8 is a flowchart of a sub-routine of the flowchart of FIG. 6 showing a process for updating the Session-Telephone-IP address-Map (STIM) of the system by users logging in using personal computers and a telephone applet.

Step 150 in FIG. 6 is the updating of the STIM with the IP address of the terminal 34. This process is shown in more detail in FIG. 8. TA 61 executes in the WB 60, step 159, and during execution it logs itself into UPD 74 as a client using the SID as a password, step 160. TA 61 then updates the STIM by inserting the IP address of the terminal 34 into table Session of UPD 74, step 161. This last step completes one row of the STIM enabling the user to receive and make telephone calls over the terminal 34 through the system.

SIP Registration

Returning to FIG. 6 the user is prompted to select either to accept calls or remain in auto attendant mode, step 151. If the user responds with a "no" in step 151, the account remains in auto attendant mode, TA 61 is updated with the chosen account status and the message indication is received from executing step 146. Both of these data are displayed on the user interface (UI) for TA 61, step 155. On the other hand, if the user responds with a "yes" in step 151, TA 61 is registered with SS 73, step 153.

SS 73 is the SIP server module of the SC 25. SIP was chosen for the current embodiment due to its ease of implementation, simplicity of design, and ease of troubleshooting. SIP call processing is much simpler than that offered by other IP telephony standards. SIP is a text-based protocol that "rides" on top of IP and as such makes system design and debugging relatively straightforward. Also there are significant performance gains to be had by using SIP over, say H.323 for constructing the system's call processing function. However, in other embodiments the same functionality can be achieved by using H.323, S/MGCP, or other call control and processing models and protocols. All three protocols are well understood, albeit still in the formative stages, and systems, such as the current system, can be readily constructed by those skilled in the art. Indeed, there are numerous sources of open source code available for users agents (in the current embodiment using SIP these would be the TA 61), SIP servers, and Media Servers. Many of these can be obtained for free over the Internet.

Figure 9:
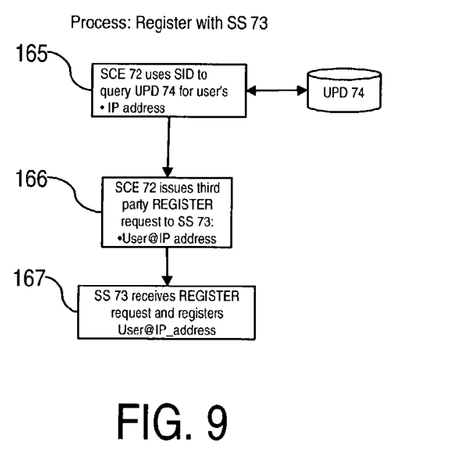
FIG. 9 is a flowchart of a sub-routine of the flowchart of FIG. 6 showing a process for registering a user's telephone applet or IP phone with the Session Initiation Protocol Server shown in FIG. 5.

FIG. 9 shows the "Process: Register with SS 73" which is a detail of step 153 in FIG. 6. Using the newly created SID the SCE 72 issues a query to UPD 74 to obtain the IP address of the terminal 34, step 165. The account number (acct_num) of the present user is used to enter table Tel_Line and return the user's telephone number (tel_num) or extension (tel_ex). Acct num is also used to enter table Session, find the most recent SID (session_id), and return the corresponding IP address (ip_address). Here again we have formed the STIM for a single user to obtain their telephone number and the IP address of their terminal 34.

After obtaining the telephone number and the IP address for the user the SCE 72 issues a third party SIP REGISTER request to the SS 73 on behalf of the users TA 61, step 166. To direct call requests to the TA 61 of terminal 34 SS 73 uses the IP address.

Both the GW 24 and SS 73 use the phone number to make call requests and proxy calls as specified in IETF RFC 2543. Thus the GW 24 forwards all incoming calls to the SS 73 as call requests. This process will be examined later in the call processing section.

Initialization Complete-Ready to Take Calls

After registration with SS 73 the program flow returns to FIG. 6 where the TA 61 is updated with the registration status, step 152. AAM 66 of the AVDS 79 is de-activated in step 154. This allows calls to be directed to the TA 61 of terminal 34 instead of to the auto attendant. The status of the auto attendant is reflected in the TA 61, step 152, by indication on the UI, step 155. Thus the user is now ready to receive and place calls using their TA 61 through the system to the PSTN. Calls can also be placed to other users of the system without going through the PSTN so long as said users are online.

Call Processing with the System

Figure 11:
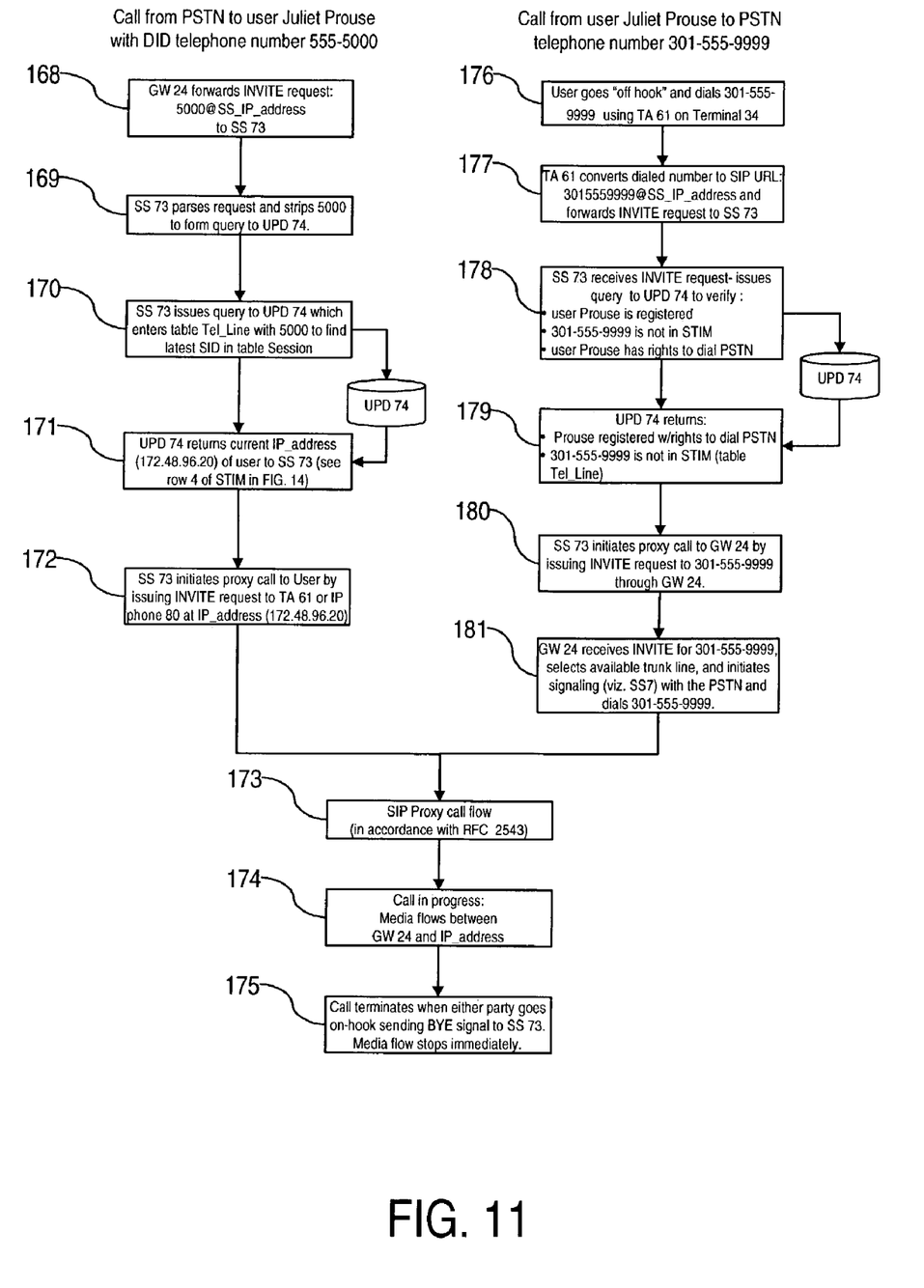
FIG. 11 is a flowchart showing a sequence of steps and processes for receiving a telephone call from the PSTN by a user logged into the system shown in FIG. 5.

For the purpose of illustration of operation of the preferred embodiment it is assumed that a call has been placed to a number that would ordinarily ring at telephone set 82 assigned DID number 301-555-5000. The DID nature of this line is designated by connection 45, in the PBX shown FIG. 1, which goes straight through the PBX to the telephone set 82. Juliet Prouse, the user to whom 301-555-5000 belongs, has logged into the system from a terminal 34 connected 33 to the Internet 32 and is online. Review of the STIM, shown in FIG. 14, shows the information for Prouse in row 4. Two call processing scenarios will be described which demonstrate the basic capability of the system of the invention. Chief among these is the processing of calls for Prouse that originates in the PSTN. The second scenario will cover processing of calls that are originated by Prouse bound for the PSTN. Both call processing scenarios are covered in the flowchart of FIG. 11.

Call from PSTN to an Online User the System

Prouse's number is dialed from a telephone 63 (shown in FIG. 1) on the PSTN 19. Numbers normally routed to the PBX of FIG. 1 have been redirected to COB 21. GW 24 receives SS7 signaling from the PSTN that a call has arrived for 301-555-5000. GW 24 forms a SIP INVITE request 5000@SS_IP_address and sends it to SS 73, step 168 in FIG. 11. SS_IP_address is the IP address of the SIP server SS 73 in SC 25. GW 24 is configured to view SS 73 as a call peer therefore all calls arriving from the PSTN are sent to SS 73 for processing and signaling by SIP proxy. SS 73 parses the request and strips the "5000" to form a query to UPD 74 in order to determine the most recent SID for telephone number 5000 in table Session, steps 169 and 170. UPD 74 returns the current IP address of user Prouse from the STIM, step 171. SS 73 forms and sends INVITE request to TA 61 at 172.48.96.20, step 172. This initiates the proxy call processing and, using FIG. 1, the first event at TA 61 is a ringing indication on its UI or through headphones 35 attached to terminal 34. When user Prouse selects off-hook (answers the call) from the UI on TA 61 media flows between GW 24 and TA 61 and the conversation can begin, steps 173 and 174. The call is terminated when either party goes on-hook, which immediately stops the media flow, and sends a BYE signal to the other party, step 175.

If Prouse does not answer, or had chosen during the login process or at any other time, not to accept calls (FIG. 6 step 151) the call would be answered by the AVDS 79 with the appropriate message as pre-programmed by Prouse through the TA 61. Call processing would have progressed as described above (steps 168 through 175) with some exceptions. SS 73 would have issued the INVITE request, step 172, to the AVDS 79 instead of the TA 61 of terminal 34. The redirection could be triggered as a result of the query issued at step 173 to locate the IP address for 301-555-5000.

Call Originating Within the System to the PSTN

For this scenario Prouse wants to place a call through her terminal 34 to 301-333-9999, a number on the PSTN that is not in UPD 74. Conditions are as in the previous scenario. After logging in Prouse sets up her preferences for call processing (records announcements, greetings, etc.) then dials 301-333-9999 all through TA 61, step 176. TA 61 converts the dialed number to a SIP URL: 3013339999@SS_IP_address and forwards an INVITE request to SS 73, step 177. SS 73 determines whether the dialed number is a user on the system by querying UPD 74 for the following: Prouse registration, finding 301-333-9999 in the STIM, and user Prouse has rights to make calls to the PSTN, step 178. UPD 74 returns to SS 73 that Prouse is registered with rights to dial the PSTN and that 301-333-9999 is not in the STIM, step 179. SS 73 initiates a proxy call to GW 24 by issuing an INVITE request to 301-333-9999, step 180. GW 24 receives and processes the INVITE by selecting an available trunk line and initiating signaling with the PSTN to dial 301-333-9999, step 181. The rest of the call processing is identical to that used for receiving calls from the PSTN as specified in the previous example, steps 173 through 175.

Redirecting Telephone Numbers

Figure 12:
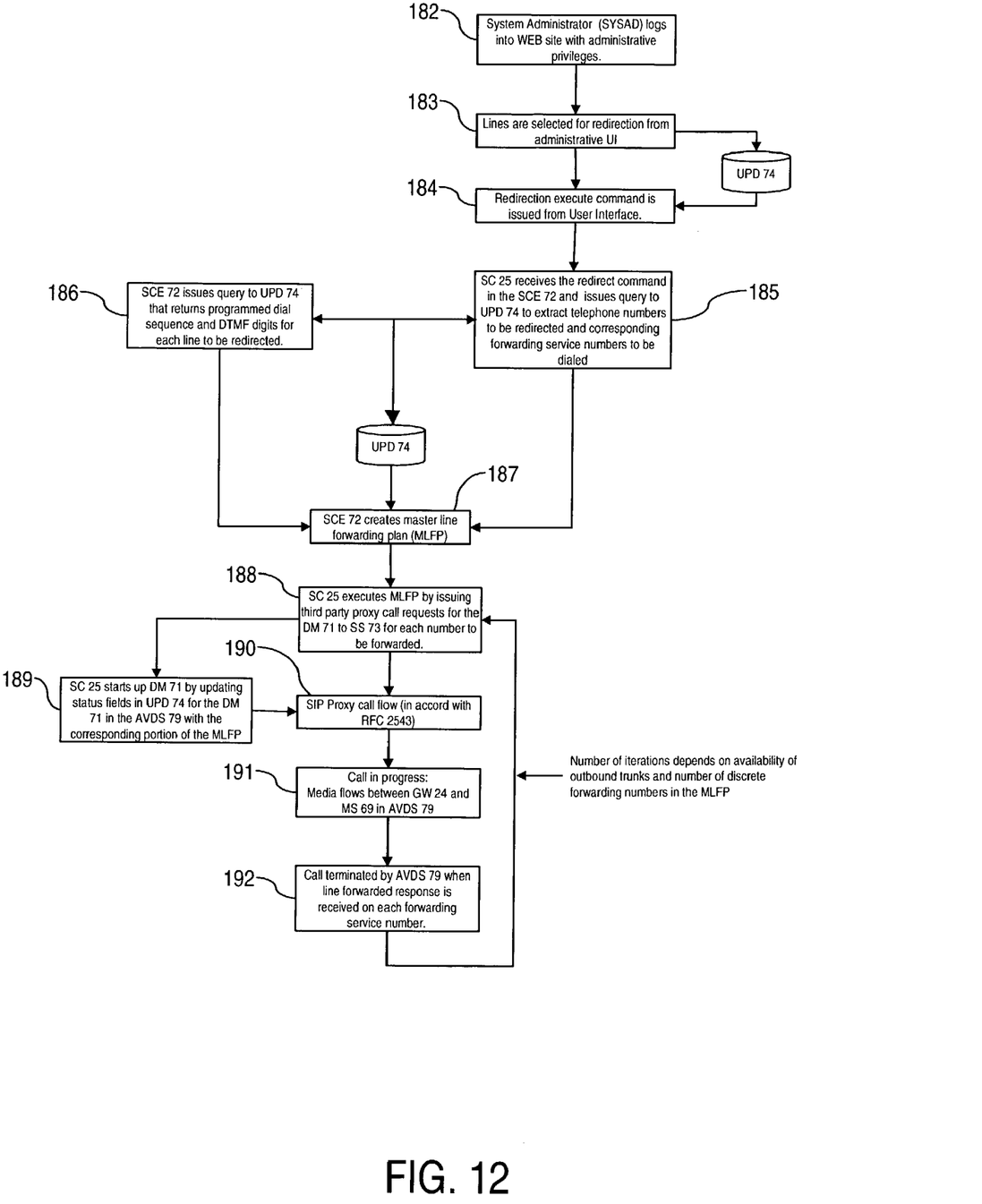
FIG. 12 is a flowchart showing a sequence of steps and processes for making a telephone call to a number in the PSTN by users logged into the system of FIG. 5.

In the preferred embodiment of the invention, it is assumed that a method for redirecting all of the necessary telephone numbers from the disaster site to the CS 23 is available. By combining the remote call forwarding for single lines with some basic capabilities of the system of the invention it is possible to mimic multiple line redirection features. FIG. 12 shows a flowchart of a process for achieving multiple line redirection using the capabilities of the system of the invention as described herein. The software to implement the flowchart could be made an integral part of the SCE 72 and its features made available to a system administrator through an appropriately crafted UI. The process of FIG. 12 assumes that the Telephone Company servicing the business undergoing the disaster offers remote call forwarding and that lines can be forwarded by issuing DTMF tones to a Voice Response Unit (VRU) at the appropriate redirection service number.

The program flow in FIG. 12 also assumes that certain data were entered into UPD 74 with respect to forwarding the telephone numbers for users in the database. Some of these data include:

1. Forwarding service number for each DID.
2. DTMF tone sequence for redirecting each DID.
3. Responses and sequence of responses from the VRU with respect to pauses and speech.

During a redirection call the system must respond with the proper DTMF tones in response to cues or questions from the VRU. Some redirection services require only the issuance of DTMF tones after entering the number to be redirected. The system and method described herein for redirecting multiple telephone numbers optionally requires customization for each user organization and/or group of lines. It is further assumed that this customization would be performed during initial system setup. Finally, VRU responses may be in the form of human speech, in which case the AVDS would optionally include a speech recognition module. Program logic would also be needed to interpret the output from the speech recognition module and direct the AVDS to respond accordingly.

Line forwarding, using the system of the invention, is accomplished by a user with administrative privileges (SYSAD) logging into the system using the site URL, step 182 in FIG. 12. Upon selecting the redirection option from a menu provided by the system over a WEB page, the SYSAD selects from all or a set of telephone numbers to be redirected and selects the redirect command, steps 183 and 184. The redirection command is received by the SCE 72, which then:

1. Issues a query to UPD 74 that will return the telephone numbers to be redirected and their corresponding forwarding service numbers, step 185, and
2. Issues another query to UPD 74 that returns the location of the DTMF tone sequence and responses from the redirect service for each redirection service number to be used, step 186.

With the returned data the SCE 72 creates a Master Line Forwarding Plan (MLFP), step 187. The whole process for a single number may be very simple. For example, dialing the forwarding service number, detecting a simple response like a tone, and issuing #-7-3 then entering the destination number. It may be that a password is required by the redirection service in which case this too will be entered by DTMF tones.

The SC 25 executes a programmed loop that starts by issuing third party proxy call requests for the DM 71 to SS 73 for each number to be redirected (forwarded), step 188. Concurrently, the MLFP is loaded into fields in UPD 74 corresponding to the DM 71, step 189. This action prepares the DM 71 for issuing the proper DTMF sequences once proxy calls are connected to the AVDS 79. Proxy calls are made and media flows between GW 24 and MS 69 as required to execute the MLFP, steps 190 through 192. The number of simultaneous calls placed to redirection service numbers will depend on availability of outbound trunks (connected to GW 24) and the number of discrete redirection service numbers. For example, it may be that a single redirection service number could be called and the DM 71 can redirect any quantity of telephone numbers in turn during a single call.

Certain system implementations may require verification of redirection for each number. A program sequence may be created that places a call to each user telephone number and detects the arrival of the call at GW 24 in the form of a proxy call request for that number. Once the proxy request with the dialed number in it is detected, the SCE 72 can issue a go on-hook and proceed to the next number to be verified.

In this disclosure there is shown and described only one embodiment of the invention along with a few examples of its versatility, flexibility, and ease of use. Thus it should be understood that various changes and modifications may be made to the above described illustrative embodiment of the invention. For example, in FIG. 1 the VPN 30 may be removed and the Router 46 directly connected to the Internet. In high security environments, the Internet 32 may be removed and terminal 34 connected to the VPN 30. Also, call processing functions may be implemented with any existing or future Internet telephony protocol standard as created and produced by the Internet Engineering Task Force. For example, instead of using the Session Initiation protocol and call processing model another embodiment can employ the H.323 protocol and call processing model. It is intended, therefore, changes and modifications of the like described above to create other embodiments of the invention be covered by the following claims.

I claim:

1. A system interconnected with the Public Switched Telephone Network and the Internet providing switching and delivery of voice telephone calls, redirected from a business subscriber on said Public Switched Telephone Network, to personal computer terminals on the Internet comprising:
   at least one of a possible plurality of control segment sites, physically separate and remote from said business subscriber's site, wherein components of said system are housed,
   a gateway device comprising a plurality of first ports with at least one of said first ports connected to a Central Office switching system of the PSTN and capable of exchanging signaling and telephone call traffic with said Central Office switching system,
   said gateway device comprising a plurality of second ports with at least one of said second ports connected to a local data network and capable of exchanging data packets with said local data network,
   computer processor means connected to said local data network for call processing and administration and hosting the software programs for said system,
   System Controller software, hosted on said computer processor means, comprising:
      a System Control Executive software module,
      a Call Processing Server whose operation is governed by protocols that are selected from the group consisting of Internet telephony standards,
      a Data Logger Module,
      a Report Generator Module,
      a User Profile Database,
      a System Statistics Database,
   Auto Attendant-Voice Mail-Dialer Software, hosted on said computer processor means, comprising:
      an Auto-Attendant module,
      a Media Server whose operation is governed by protocols that are selected from the group consisting of Internet telephony standards,
      a Dialer Module,
      a Voice Mail Announcements Database
   WEB Server software, hosted on said computer processor means,
   a software telephone applet, hosted on said WEB server
   storage means for storing data and software programs of said system on a storage medium,
   a router device connected to said local data network,
   a virtual private data network connected to said router through a first high speed data line,
   the Internet connected to said virtual private network through a second high speed data line,
   a plurality of personal computer terminals with means to connect to and exchange data with said Internet and or said virtual private network,
   a WEB browser hosted on said personal computer terminals,
   headphones or speakers and a microphone connected to said personal computer terminals,
   means to convert sound into data packets, compliant with protocols selected from the group consisting of Internet telephony standards and Internet Protocol standards, and vice versa through said personal computers,
   a plurality of telephone sets with means to connect to and exchange data with said Internet and or said virtual private network,
   means to convert sound into data packets, compliant with protocols selected from the group consisting of Internet telephony standards and Internet Protocol standards, and vice versa through said telephone sets, a plurality of disaster recovery sites, physically separate and remote from each of said business subscriber's sites, a third high speed data line connecting said virtual private network with each of said disaster recovery sites through a second data router device housed within each of said disaster recovery sites, a second local data network connected to said second data router at each of said disaster recovery sites, a plurality of said personal computer terminals connected to said second local data network at each of said disaster recovery sites, a plurality of said telephone sets connected to said second local data network at each of said disaster recovery sites.

2. The system of claim 1 wherein telephone calls can be made from said user terminals to telephone numbers on the Public Switched Telephone Network.

3. In the system of claim 1 a method for switching a plurality of calls destined for telephone numbers at a first group of locations to said personal computer terminals connected to the Internet or said Virtual Private Network, comprising the steps of:

redirecting a plurality of call paths for said telephone numbers corresponding to local communication lines at said first group of locations to local communication lines at one or more said control segment sites, connecting said personal computer terminals to the Internet or said Virtual Private Network, initiating a session for each of said personal computer terminals by logging into said system, downloading said software telephone applet, containing a session identification code generated by said System Controller thus uniquely identifying each said telephone applet to said System Controller, obtaining the Internet Protocol address of each of said personal computer terminals at the beginning of said session, transmitting each said Internet Protocol address to said System Controller, forming a Session-Telephone-Internet Protocol Address-Map through a process comprising the following steps:

storing said Internet Protocol addresses in said User Profile Database, associating said Internet Protocol addresses with users of said personal computer terminals through pre-established accounts in said User Profile Database, for said users, further associating said telephone numbers corresponding to said users with said pre-established accounts on said system, further associating said Internet Protocol addresses with said telephone numbers, further associating said Internet Protocol addresses with said session identification code, registering said personal computer terminals with said Call Processing Server by using said Session-Telephone-Internet Protocol Address-Map, registering said gateway device with said Call Processing Server, whereby said calls, having been redirected to said control segment sites, will reach said gateway device wherein said gateway device signals said Call Processing Server wherein said Call Processing Server signals said personal computer terminals logged into said system thereby causing an indicium to issue from said software telephone applet, whereby said user can elect to answer the call by interacting with said software telephone applet thereby causing an answer signal to issue from said software telephone applet, whereby said answer signal is received by said Call Processing Server wherein said Call Processing Server signals said gateway device to establish a media connection to said software telephone applet, whereby said gateway device establishes a direct connection, using said Internet Protocol, with said software telephone applet and media begins to flow thereby establishing the conversation between the calling party and said user.

4. The method of claim 2 wherein said calls, having been redirected to said control segment sites, will reach said gateway device wherein said gateway device signals said Call Processing Server wherein said Call Processing Server provides said Internet Protocol address corresponding to each of said Personal Computer Terminals to said gateway device wherein said gateway device establishes a direct connection with each of said personal computer terminals wherein said gateway device signals each of said personal computer terminals logged into said system thereby causing an indicium to issue from said software telephone applet, wherein said user can elect to answer the call by interacting with said software telephone applet thereby causing an answer signal to issue from said software telephone applet wherein said answer signal is received by said Call Processing Server wherein said Call Processing Server signals said gateway device to establish a media connection to said software telephone applet wherein media begins to flow between said gateway device and each of said personal computer terminals thereby establishing the conversation between the calling party and said user.

* * * * *